United States Patent [19]

Hansen et al.

[11] 3,744,928

[45] July 10, 1973

[54] ROTOR OVERLOAD PROTECTION

[75] Inventors: Knute C. Hansen, Shelton; John C. McKeown, Bridgeport, both of Conn.

[73] Assignee: United Aircraft Corporation, East Hartford, Conn.

[22] Filed: Oct. 7, 1971

[21] Appl. No.: 187,341

[52] U.S. Cl. .......................... 416/31, 416/43, 416/61
[51] Int. Cl. ............................................. B64c 27/66
[58] Field of Search ................... 416/31, 43, 36, 61; 244/17.13, 17.25, 17.11

[56] References Cited
UNITED STATES PATENTS

| | | | |
|---|---|---|---|
| 2,936,836 | 5/1960 | Ellis | 416/43 X |
| 3,175,786 | 3/1965 | Frank et al. | 244/17.13 |
| 3,464,651 | 9/1969 | Lightfoot | 244/17.13 |
| 3,469,644 | 9/1969 | Harding | 416/61 X |
| 3,482,805 | 12/1969 | Knemeyer | 416/31 UX |

*Primary Examiner*—Everette A. Powell, Jr.
*Attorney*—Melvin Pearson Williams

[57] ABSTRACT

Overloading of rotor blades in a vertical lift aircraft such as a helicopter is avoided by limiting blade pitch to a value below that at which permissible loading will obtain. Strain in the blade pitch rods is monitored and used, together with the rate of change thereof as a pitch limit control signal to limit the effect of pilot control on the actual pitch of the rotor blades. In one embodiment, the strain in the rotor pitch push rods is compared against a lower threshold load value, and an excess causes the rate of change of the strain to be utilized as one input to the pitch limiting control signal; the load is also compared to an upper threshold, and an excess causes the actual load to be used as a second input to the pitch limit control signal. The pitch limit control signal in one embodiment is applied directly to the collective pitch outer loop (or major control loop), but is further modified when applied to the longitudinal cyclic pitch outer control loop. The further modification multiplies the limiting signal with air speed and pitch rate to prevent unwanted longitudinal pitch input at low air speeds, particularly as a result of excess commands in collective pitch.

3 Claims, 1 Drawing Figure

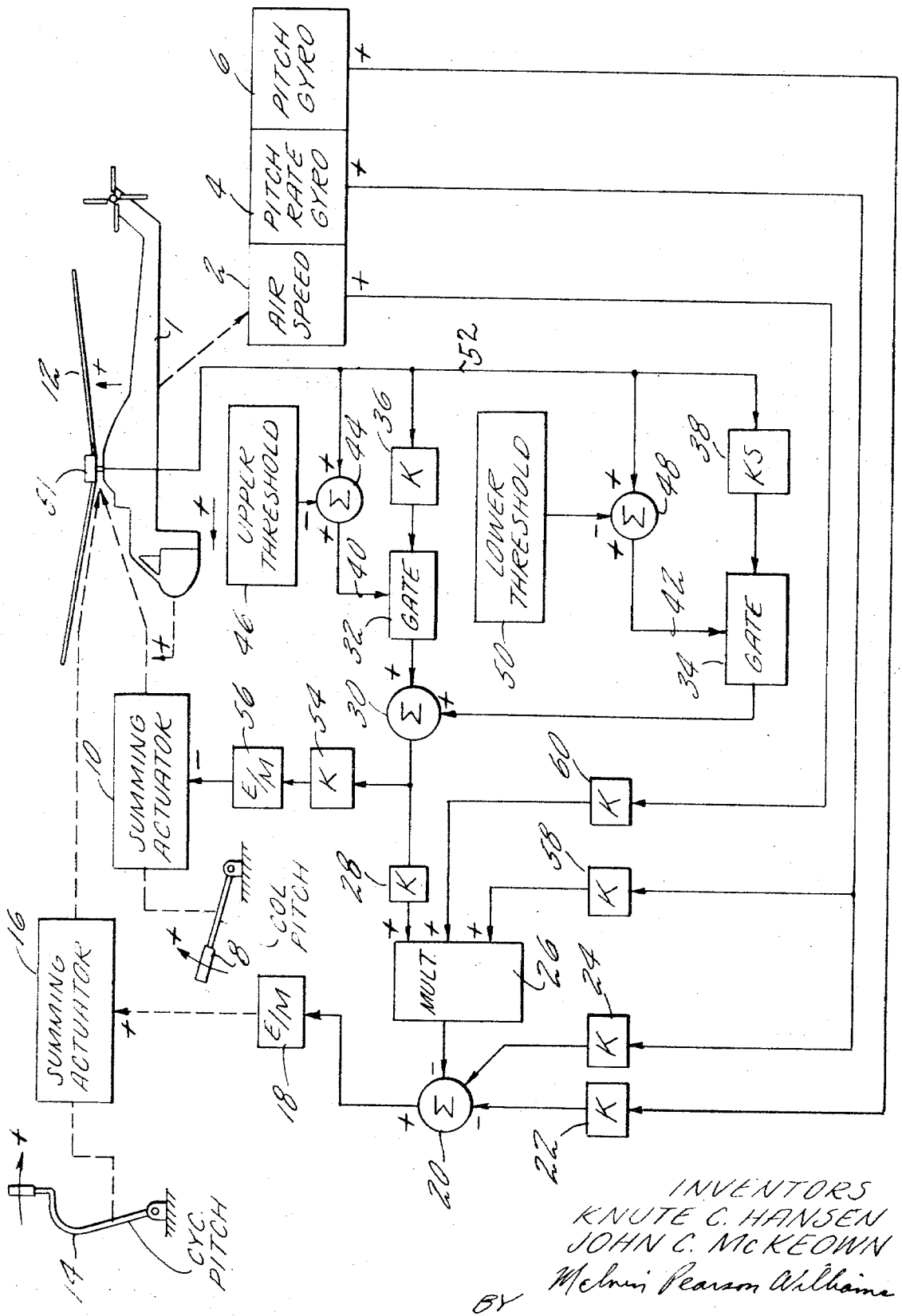

ROTOR OVERLOAD PROTECTION

The invention herein described was made in the course of or under a contract with the Department of the Army.

BACKGROUND OF THE INVENTION

1. Field of Invention

This invention relates to an aircraft control system, and more particularly to protection from overloading the rotor blades of a vertical lift aircraft as a result of excessive pitch of the rotor blades.

2. Description of the Prior Art

Vertical lift aircraft, such as helicopters, have at least one main bladed rotor, the pitch of the blades being controlled to maneuver the aircraft. In a first control function, called collective pitch, all of the blades are given essentially the same pitch for the purpose of raising the aircraft vertically upward (or at least in a direction perpendicular to the main plane of the rotor system). In a second control, called cyclic pitch, the pitch of the blade is determined by its angular position with respect to the direction orientation of the aircraft. Longitudinal pitch causes the blades to have higher pitch when on the port or starboard than when in the fore or aft direction, and lateral pitch is caused by the blades having a higher pitch in the fore and aft position than on the port or starboard. Longitudinal pitch causes the nose of the aircraft to accelerate upwardly or downwardly with respect to the remainder of the aircraft, whereas lateral pitch causes the aircraft to tilt in what is commonly referred to as roll. To fly in a forward direction, a certain amount of longitudinal pitch is required so that the main rotor, in a sense, drags the aircraft in a forward direction.

As is known in the art, the rotor blades must be light, flexible and strong. Obviously, strength is a trade off with flexibility and lightness. Therefore, there are design limitations on the amount of loading of the rotor blades which can be tolerated, particularly in a flexing environment, without fracture or other damage to the blades. Loading of the blade occurs as a result of the blades providing the anti-gravitational forces required to keep the aircraft aloft. Therefore, a tendency to accelerate the aircraft upwardly significantly increases the loads on all of the blades. Similarly, if the aircraft is in a forward pitch (nose down) it has a tendency to fly in a downward direction and there is less load on the blades whereas an upward pitch (nose up) tends to cause the aircraft to fly in a climbing attitude thus accelerating the aircraft against the forces of gravity which in turn puts a greater load on the rotor blades.

In maneuvering the aircraft, it is essential that the pilot have maximum possible control over the maneuvers. Consider as an example the desire to avoid a collision with another aircraft in the vicinity. Should the pilot desire to fly over the interfering aircraft, he may pull hard on the collective pitch control to cause his aircraft to veer vertically upward at a high rate of climb. This, on the other hand, may result in excess loading of the rotor blades so that a fracture or other disability of the aircraft may result.

Initially, this problem was partially compensated for by utilizing G-meter indicators which measure the acceleration of the aircraft in a vertical direction. By observing the vertical acceleration indicator on the G-meter, the pilot would alter the control position so as to avoid gravitational acclerations in excess of those established as being safe with respect to the design limits of the rotor blades. In an improved version of this, it has been known to monitor the strain in one of the rotor blade pitch control push rods, the strain in which is a function of the load on the rotor blade, to provide an indication on the control panel in the cockpit. This must be visually monitored by the pilot, as he maneuvers the aircraft, to insure that he does not command the aircraft to assume either cyclic or collective pitch which would result in an overloading of the rotor blades. However, the rotor load indicator still requires that the pilot visually observe rotor load and make continual adjustments in the position of the cyclic and collective pitch controls, thereby diverting his attention from the emergency which he is trying to avoid.

The stability of vertical lift aircraft has for some time been improved in various respects by means of automatic control systems, sometimes referred to as stability loops or inner control loops. For instance, to prevent excessive tilting of the aircraft, pitch and roll gyro inputs, and pitch and roll rate gyro inputs, have been utilized as negative feedback to limit or soften the response of the aircraft, for instance, or to otherwise alter the stability characteristics of the aircraft. However, in the case of the problem described hereinbefore, there are unique problems which have heretofore prevented the effective utilization of automatic control. For instance, the loading of the rotor blades is due to pitch on the individual blades at any instant, which is a combined result of collective pitch control inputs and cyclic pitch control input. Should an excessive blade pitch input be given by the pilot with the respect to one of these controls, it is impossible to determine whether the overloading is due to collective pitch or to cyclic pitch. The effect on blade pitch resulting from cyclic pitch (nose up or down) is a cyclic variation about a mean or average value which results from collective pitch. In order to allow maximum maneuverability in order to avoid emergencies, it is desired to use the maximum possible inputs with respect to loading of the rotor blades. On the other hand, if this were done, then, once the limit were reached, even a change in the control function being applied to the pitch control of the rotor would not instantaneously change the loading on the rotor and so the maximum load would be exceeded due to an overshoot. On the other hand, in other control functions, the rate of change of the function is frequently indicative of the impending criticality or other limitation on the function so that negative rate damping can be used to avoid this problem. But in this case, the rate of change of loading has nothing to do with the absolute magnitude of the loading. On the other hand, if this were anticipated simply by lowering the design maximum so that the overshoot would fall within permitted ranges, then once the stable operation is achieved this system would still be prevented from reaching the actual design maximum, thereby putting an undue limitation on the maneuverability of the aircraft over the longer period.

Another problem is the interrelationship between cyclic pitch and collective pitch. Consider as an example a helicopter hovering close to the ground. If an emergency situation then dictated that a high vertical acceleration should be utilized to gain altitude at a high rate, the pilot would normally apply maximum collective pitch. If, on the other hand, the aircraft is in a confined area, such as between tall trees, a serious situation could result if a limiting signal, correcting collective and cyclic pitch, were utilized since the correction could also provide an input for nose down in longitudinal cyclic pitch, which would cause the aircraft to fly forward, perhaps hitting a tree or other obstruction. Thus, control functions utilized in such aircraft with respect to relatively independent or loosely coupled parameters are not applicable to the rotor blade overloading problem.

SUMMARY OF INVENTION

The object of the present invention is to automatically prevent overloading of rotor blades in vertical lift aircraft.

According to the present invention, commands which control pitch of the rotor blades in a vertical lift aircraft are limited in response to the loading of the rotor blades. In further accord with the present invention, the rate of loading of rotor blades is utilized to limit pitch at a first value of load on the blades, and the load on the blades itself is used to limit blade pitch at a higher blade load. In still further accord with the present invention, the limitation of cyclic pitch to avoid undue loading of rotor blades is governed as a function of speed and rate of pitch of the aircraft, to isolate the limitation on collective pitch from limitation on longitudinal cyclic pitch, particularly at low speeds.

The present invention makes it possible for a pilot to put any input he desires into longitudinal cyclic pitch or collective pitch without suffering the consequences of undue loading on the rotor blades. The device gives the pilot the freedom to react to situations without limitation on the manual manipulation of his controls. The invention provides for an automatic limitation of the load on rotor blades without any undue limit on the maximum response which can be achieved, without overshooting into a dangerous overloaded condition.

The invention also adds a measure of isolation between limitation on collective pitch and limitation on longitudinal cyclic pitch by altering the effect of an overload condition on the limitation of longitudinal cyclic pitch as a function of aircraft pitch rate and aircraft speed; at low speeds, or at low pitch rates, an overload condition will have only a minor effect on longitudinal cyclic pitch, while having full effect on collective pitch. At high speeds or in conditions of high pitch rates, the effect on limitation of longitudinal cyclic pitch is greater.

The present invention may be readily implemented utilizing components and technology available in the art, and are easily incorporated into an existing aircraft control system.

Other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein comprises a simplified schematic block diagram of a preferred embodiment of the present invention.

DESCRIPTION OF THE PREFERRED EMBODIMENT

In the present embodiment, it is assumed that the aircraft is controlled by control means including mechanical actuators responsive to mechanical movement of manual controls or levers and mechanical modifications thereof as a result of electronic control systems. In an aircraft of that type, the pitch of the rotor blades is controlled by a collective pitch control loop, a longitudinal cyclic pitch control loop, and a lateral cyclic pitch control loop; heading is controlled by a rotary rudder control. However, the present invention relates only to collective pitch and longitudinal cyclic pitch and the description herein is therefore limited in that fashion. Care should be taken not to confuse pitch of the rotor blades with aircraft pitch (nose up or nose down). Referring now to the drawing, an aircraft 1 includes an airspeed indicating device 2, a pitch rate gyro 4, and pitch gyro 6, all as is well known in the art. A collective pitch control 8 provides a mechanical input to a summing actuator 10, the output of which controls the degree of pitch of all of the rotor blades 12 simultaneously. A cyclic pitch control 14 provides a mechanical input to a summing actuator 16, the output of which controls longitudinal cyclic pitch of the blades 12, thereby to cause the aircraft to assume a relatively nose up, nose down or level attitude. Another mechanical input to the summing actuator 16 is an electromechanical actuator 18, an electrical input to which causes a mechanical motion applied as an input to the summing actuator 16. The electromechanical actuator 18 is driven by a summing network 20 which combines the signals derived in accordance with the present invention with signals normally used in an inner stability control loop. Such signals may be provided by a pair of amplifiers 22, 24 in response to the pitch gyro 6 and the pitch rate gyro 4, respectively. These inputs operate as is well known in the art to stabilize the pitching motion (nose up and nose down) of the aircraft. Another input to the summing network 20 is provided by an electronic multiplication circuit 26 which provides an output which is a function of the product of three separate inputs thereto. One of the inputs to the multiplier 26 is from an amplifier circuit 28 which is fed a raw limit signal by a summing network 30, the output of which is a function of the summation of signals applied thereto by a pair of gate circuits 32, 34. Each of the gates 32, 34 become operative to pass a signal from a related amplifier 36, 38 in response to a positive input signal at a corresponding input 40, 42. The amplifier 36 has a linear gain, but the amplifier 38 provides a function of the rate of change of loading, as indicated by the LaPlacian operator $S$. The input 40 is derived from a summing network 44 which will provide a signal whenever the load on the rotor blade is in excess of an upper threshold of load control as established by an upper threshold level generating circuit 46. Similarly the input 42 is operated by a positive signal from a summing network 48 in response to the load on the rotor blades being in excess of a lower threshold established by a lower threshold level control circuit 50. To determine the load on the rotor blade, means are provided for measuring the load on at least one of the rotor blades, such as by a strain gauge 51 mounted on a push rod (not shown) which is customarily utilized to alter the pitch setting of the rotor blade. The output of the strain gauge 51 provides a signal on a signal line 52 as an input to the amplifiers 36, 38 as well as to the summing networks 44, 48 that control gating of the amplifiers 36, 38.

The output of the summing network 30 is applied, in addition to the amplifier 28 to an amplifier 54 which feeds an electromechanical actuator 56 thereby to provide a limiting input to the summing actuator 10 to limit the effect of the motion supplied thereto by the collective pitch control when the design rotor load is being exceeded.

Assume that the aircraft is in flight, with a certain amount of collective pitch applied thereto, and an emergency occurs so that the pilot pulls up on the collective pitch lever, thereby to impart a rapid vertical acceleration to the aircraft. The loading on the blades will begin to increase at a very rapid rate, so that the strain gauge 51 develops an increasing signal which, when larger than the statically generated lower threshold signal from the circuit 50, provides a positive output of the summing network 48, so that the gate 34 will operate and provide a signal from the amplifier 38 which is a function of rate of change (or increase) in the strain gauge signal, and therefore is a function of the rate of change of loading of the rotor blades. This signal will be passed by the gate 34 to the summing network 30, and immediately drive both of the amplifiers 28, 54. The effect of the summing actuator 10 with respect to collective pitch is a function solely of the output of the amplifier 54. However, the effect which this has on the summing actuator 16 with respect to longitudinal cyclic pitch depends upon the output of the multiplier 26 which in turn depends upon the output of a pair of amplifiers 58, 60. The amplifier 58 provides a signal which is a function of the rate of change of aircraft pitch, whereas the amplifier 60 provides a signal which is a function of the speed of the aircraft. If the aircraft is flying at low speed, with a relatively constant pitch, then the inputs from the amplifiers 58, 60 to the multiplier 26 will cause the output of the multiplier to be a very small fraction of the signal applied thereto by the amplifier 28. On the other hand, if the aircraft is flying at a high speed, with a significant pitch rate, then a higher fraction of the output of the amplifier 28 will be applied to the summing network 20 by the multiplier 26. Should the aircraft by flying at high speed with a high rate of pitch, then a signal in excess of the output of the amplifier 28 may be applied to the summing network 20. In other words, the output of the multiplier 26, as a function of the product of all three of its inputs, can vary from a small fraction of the output of the amplifier 28 to a factor much greater than the output of the amplifier 28.

As the loading on the blade increases in this example, the strain gauge 51 will eventually provide a signal on the line 52 which is in excess of a signal representative of an upper threshold provided by the circuit 46, so that the summing network 44 will provide a positive signal on the line 40 causing the gate 32 to operate to apply the output of the amplifier 36 to the summing network 30. This signal is a function of the load itself. Thus, in accordance with the present invention, the rate of loading is used to limit pitch at a first lower threshold, and loading is itself used to limit pitch at a higher threshold of loading. The upper threshold generating circuit 46 and lower threshold circuit 50 may simply comprise relatively stable voltage supplies feeding a potentiometer which is suitably adjusted to provide a signal commensurate with signals from the strain gauge 51 equivalent to the threshold of loading at which limiting action is to be effective as described hereinbefore. Multiplier circuit 26 may comprise any voltage multiplier well known in the art. The gates 32, 34 may comprise any polarity sensitive switching devices, such as relays having diodes on the control line thereof or other simple devices. The gain of each amplifier ($K$) is individually selected to suit design requirements determined from well-known stability analysis of the aircraft and the desired load limits.

In the embodiment shown in the drawing, it is assumed that the longitudinal pitch control means includes an inner stability loop, and the collective pitch control does not. However, it should be readily appreciated that the collective pitch control may include an inner or stability loop, or another electronic automatic control loop such as an automatic altitude holding control loop. Similarly, the cyclic pitch input could be applied directly to the summing actuator 16 as is the input directly applied to the summing actuator 10. Also, additional control inputs may be applied to either or both loops, in common or separately, in any given implementation of the present invention. Thus, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. Rotor blade load limit control apparatus for a vertical lift aircraft having collective pitch control and longitudinal cyclic pitch control, comprising:
    load signal means for developing a load signal proportional to the load on at least one blade of the rotor of said aircraft;
    first means responsive to said load signal means for providing a first signal proportional to the rate of change of load on the blade of said rotor related to said load signal means in response to said load signal being of a magnitude in excess of a lower threshold magnitude;
    second means responsive to said load signal means for providing a second signal proportional to said load signal in response to said load signal having a magnitude in excess of an upper threshold magnitude;
    sum means responsive to said first and second means for providing a limit signal as the sum of said first and second signals; and
    control means responsive to said sum means for altering the operation of said collective pitch control and said longitudinal cyclic pitch control in a manner to reduce the loading on said blades in proportion to said limit signal.

2. Rotor blade load limit control apparatus for a vertical lift aircraft having collective pitch control and longitudinal cyclic pitch control, comprising:
    limit signal means developing a raw limit signal in response to the load on at least one blade of the rotor of said aircraft;
    speed means for generating a signal proportional to the speed of the aircraft;
    pitch means for generating a signal proportional to the rate of change of pitch of the aircraft;
    product means responsive to said limit signal means, said speed means and said pitch means to generate a longitudinal cyclic pitch limit signal as the product of said speed signal, said pitch rate signal and said raw limit signal; and control means responsive to said sum means and said product means for altering the operation of said collective pitch control in response to said raw limit signal and for altering the operation of said longitudinal cyclic pitch control in response to said longitudinal cyclic pitch limit signal, in a manner to reduce the loading on said blades in proportion to said limit signals.

3. Rotor blade load limit control apparatus for a vertical lift aircraft having collective pitch control and longitudinal cyclic pitch control, comprising:

load signal means developing a signal proportional to the load on at least one blade of the rotor of said aircraft;

first means responsive to said load signal means for providing a first signal proportional to the rate of change of load on the blade of said rotor related to said load signal means in response to said load signal being of a magnitude in excess of a lower threshold magnitude;

second means responsive to said load signal means for providing a second signal proportional to said load signal in response to said load signal having a magnitude in excess of an upper threshold magnitude;

sum means responsive to said first and second means for providing a raw limit signal as the sum of said first and second signals;

speed means for generating a signal proportional to the speed of the aircraft;

pitch means for generating a signal proportional to the rate of change of pitch of the aircraft;

product means responsive to said sum means, said speed means and said pitch means to generate a longitudinal cyclic pitch limit signal as the product of said speed signal, said pitch rate signal and said raw limit signal; and control means responsive to said sum means and said product means for altering the operation of said collective pitch control in response to said raw limit signal and for altering the operation of said longitudinal cyclic pitch control in response to said longitudinal cyclic pitch limit signal, in a manner to reduce the loading on said blades in proportion to said limit signals.

* * * * *